United States Patent [19]

Akai

[11] Patent Number: 4,845,363
[45] Date of Patent: Jul. 4, 1989

[54] DEVICE FOR DETECTING RADIOACTIVE RAYS

[75] Inventor: Yoshimi Akai, Yaita, Japan

[73] Assignee: Kabushiki Kaisha Toshiba, Kawasaki, Japan

[21] Appl. No.: 911,329

[22] Filed: Sep. 25, 1986

[30] Foreign Application Priority Data

Sep. 26, 1985 [JP] Japan ................ 60-213347

[51] Int. Cl.⁴ .................................................. G01T 1/20
[52] U.S. Cl. ................................ 250/368; 250/366; 250/367; 250/370.09; 250/370.11
[58] Field of Search .............. 250/370 I, 370 G, 368, 250/366, 367

[56] References Cited

U.S. PATENT DOCUMENTS

| | | | |
|---|---|---|---|
| 4,059,766 | 11/1977 | Rougeot | 250/366 |
| 4,234,792 | 11/1980 | DeCou et al. | 250/367 |
| 4,560,882 | 12/1985 | Barbaric et al. | 250/368 |

FOREIGN PATENT DOCUMENTS

| | | | |
|---|---|---|---|
| 58230 | 8/1985 | European Pat. Off. | 250/370 I |
| 172273 | 10/1982 | Japan | 250/370 I |
| 93372 | 5/1985 | Japan | 250/370 I |

*Primary Examiner*—Carolyn E. Fields
*Attorney, Agent, or Firm*—Finnegan, Henderson, Farabow, Garrett, & Dunner

[57] ABSTRACT

In an X-ray detecting device for an X-ray computed tomography scanner, an indium tin oxide layer is deposited on a surface of a rectangular scintillator element which opposes X-ray incident surface thereof. The other surfaces of the element are coated with a light reflecting layer. An amorphous silicon film is formed on the indium tim oxide layer to form surface barrier type photo-diode and an electrode is further deposited on the amorphous silicon film. Incident X-rays are converted into light rays in the scintillator element, and light rays are reflected from the reflecting layer to the surface barrier type photo-diode and converted into an electric signal, which is picked up by the electrode.

13 Claims, 5 Drawing Sheets

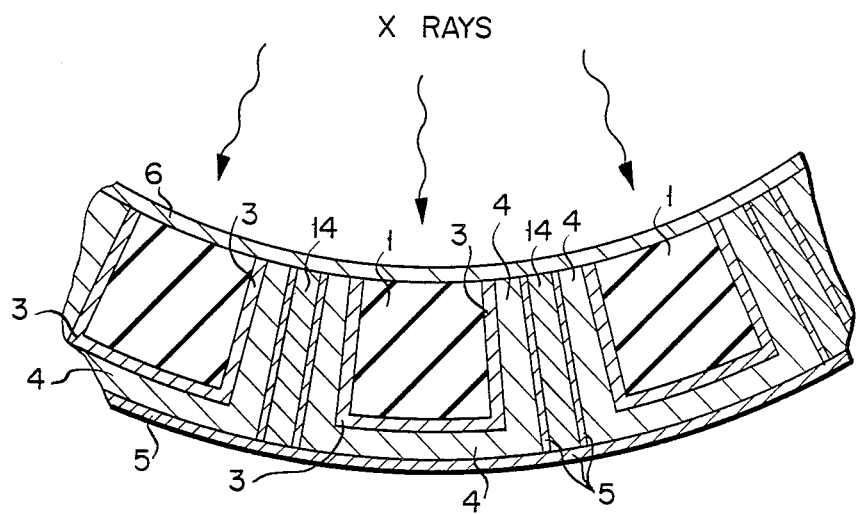

DEVICE FOR DETECTING RADIOACTIVE RAYS

BACKGROUND OF THE INVENTION

The present invention relates to a device for detecting radiation and, more particularly, to a device associated in an X-ray computed tomography scanner for detecting X-rays.

An X-ray computer tomography scanner (hereinafter referred to as "an X-ray CT scanner") has an X-ray detecting array. The array detects the X-rays generated from an X-ray source and transmitted through a body to be inspected and generates signals. These signals are processed to display a tomographic image. A third-generation X-ray CT scanner has an X-ray detecting array formed by arraying, for example, 512 X-ray detecting devices on a circular arc, and rotating the array around the body to be inspected, together with an X-ray source. A fourth-generation X-ray CT scanner has an X-ray detecting array formed by arranging, for example, 2304 X-ray detecting devices in a circle around a body to be inspected. Only an X-ray source is rotated, and the array is secured to the frame of the scanner. A solid-state device in which a scintillator element for converting X-rays into light rays, and a photo-diode bonded to the scintillator element for detecting the converted light rays has been proposed as an X-ray detecting device associated with such an X-ray detecting array, and has been used in the X-ray CT scanner. In this solid-state X-ray detecting device, light rays are absorbed by a scintillator element in the scintillator element for generating light rays by absorbing or scattering the ray. It is pointed out that some ratio of the light rays do not arrive at a photo-diode thus deteriorating the conversion efficiency. In the fourth generation X-ray CT scanner, the scintillator element and the photo-diode are bonded by an optically transparent bonding material to form an X-ray detecting device. Tens of devices are associated in a detector pack, and the packs are arranged in a circle to form a detecting array. This X-ray detecting device has the drawback that the bonding of the scintillator element to the photo-diode by an adhesive lowers the fabricating efficiency, and the positioning of the scintillator element and the photo-diode is not accurate. Further, the adhesive applied between the scintillator element and the photo-diode is likely to exfoliate due to the ambient temperature changes, and its optical properties vary with time to alter the detecting value.

SUMMARY OF THE INVENTION

It is an object of the present invention to provide a device for accurately detecting radioactive rays which can be readily fabricated, and is not significantly affected by ambient temperature variations.

According to the present invention, a device for detecting X-rays is provided comprising a scintillator element having a plurality of surfaces, one of the surfaces being mirror-polished for converting incident X-rays into light rays; a light reflecting layer formed on the surface except the mirror-polished surface of the scintillator element; a transparent electrode formed on the mirror-polished surface of the scintillator element; a photo-diode structure formed of an amorphous semiconductor material formed on the transparent electrode for detecting the light rays generated from the scintillator element to convert the light rays into an electric signal; and an electrode formed on the photo-diode structure.

BRIEF DESCRIPTION OF THE DRAWINGS

FIG. 10 is a sectional view schematically showing the construction of the X-ray detecting array associated with the X-ray detecting device in FIG. 6.

DETAILED DESCRIPTION OF THE PREFERRED EMBODIMENTS

Figure 1:
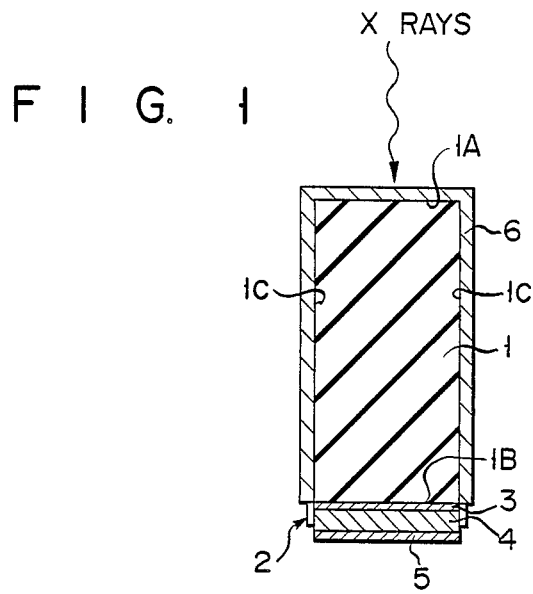
FIG. 1 is a sectional view schematically showing an X-ray detecting device according to an embodiment of the present invention.

FIG. 1 shows an X-ray detecting device adapted for use with an X-ray CT scanner according to an embodiment of the present invention. The detecting device shown in FIG. 1 includes a rectangular scintillator element 1 having an end surface 1A upon which radiation such as X-rays is incident, a second end surface 1B opposite end face 1A, a first pair of opposing side surfaces 1C, and a second pair of opposing side surfaces 1D substantially perpendicular to end surfaces 1A and 1B and side surfaces 1C. Surface 1A and the surfaces of surface pairs 1C and 1D are coated with a reflecting layer 6 for reflecting light rays. Surface 1B is not coated with a reflecting layer. A transparent layer of indium tin oxide (hereinafter referred to as an "ITO layerr") 3 is deposited on surface 1B and a film 4 of amorphous silicon is formed on ITO layer 3 to form a surface barrier type photo-diode 2. ITO layer 3 extends onto at least one of the surfaces of surface pair 1D to form an electrode 3A. An electrode 5 is further deposited on the surface of layer 4. Scintillator element 1 emits photons in response to X-rays incident upon element 1. The photons impinge upon photo-diode 2, which generates a corresponding electric signal and provides this signal to electrode 5.

Figure 4:
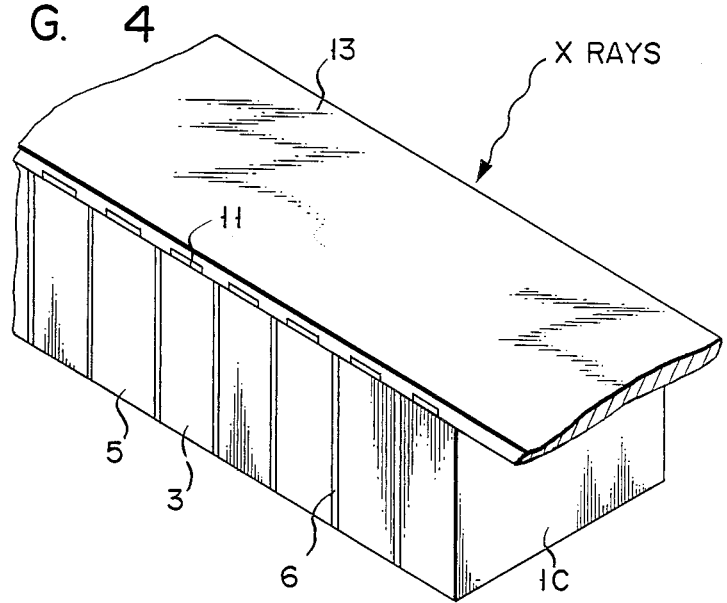
FIG. 4 is a perspective view schematically showing the construction of the X-ray detecting device associated with the X-ray detecting device in FIG. 1.

A number of X-ray detecting devices having the above described structure are closely arrayed on a substrate 13, as shown in FIG. 4, and fixedly secured by an adhesive to form an X-ray detecting array. Electrode 3A of the X-ray detecting device is electrically coupled with a signal pattern (not shown) on substrate 13 to produce the electric signal generated in the photo-diode. Electrode 5 is connected through leads (not shown) directly to pattern 11 on the substrate. A number of such X-ray detecting devices are associated to comprise a third or fourth generation X-ray CT scanner.

A method of fabricating the X-ray detecting device shown in FIG. 1 will now be described.

As a first step, scintillator element 1 is prepared. Surface 1B to be formed with ITO layer 3 of the element is polished or glazed to form a flat mirror-surface. This element is then cleaned. If element 1 is chemically unstable, the element is cleaned with an organic solvent. If element is chemically stable, the element is cleaned with gas plasma in a glow discharge electric field in the presence of a rare gas. As a second step, layer 6 is coated on surface 1A and the surfaces of surface pairs 1C and 1D. Polished surface 1B of element 1, upon which amorphous silicon layer 4 and ITO layer 3 are to be formed, is not coated with layer 6. As a third step, ITO layer 3 is formed by a sputtering method on surface 1B of element 1. Subsequently, in as a fourth step, amorphous silicon layer 4 is formed on layer 3 by a glow discharge decomposing method using rare gas such as monosilane gas ($SiH_4$) and Ar gas. In as a fifth step, electrodes 5 are formed by vacuum deposition on silicon layer 4 and the side surface of element 1.

Figure 5:
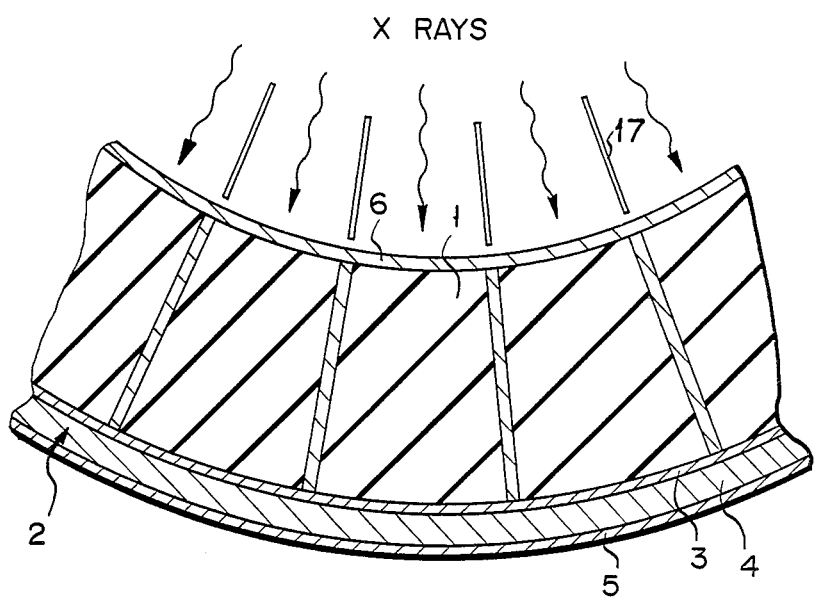
FIG. 5 is a sectional view schematically showing the construction of the X-ray detecting device associated with the X-ray detecting device in FIG. 1.

In the second fabrication step as described above, a number of elements 1 coated with layer 6 are prepared. Elements 1 may then be arrayed on a circular shape and processed in accordance with the third, fourth and fifth steps to form an X-ray detecting array adapted for third and fourth generation X-ray CT scanners as shown in FIG. 5. The forth generation X-ray CT scanner is not provided with a collimator 17 in the arrangement shown in FIG. 5.

Figure 2:
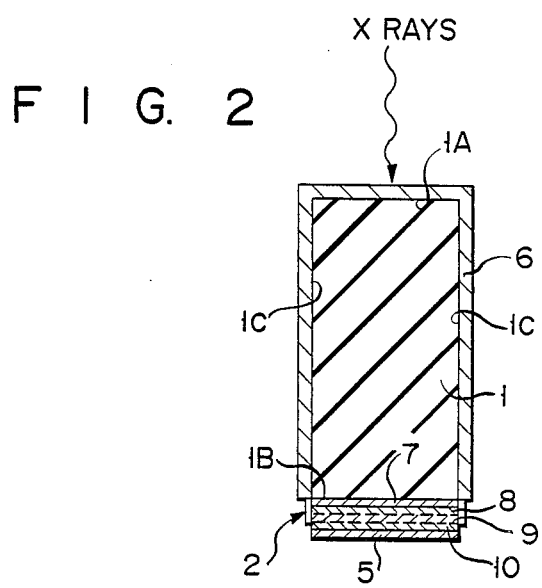
FIG. 2 is a sectional view schematically showing an X-ray detecting device according to another embodiment of the invention.
Figure 3:
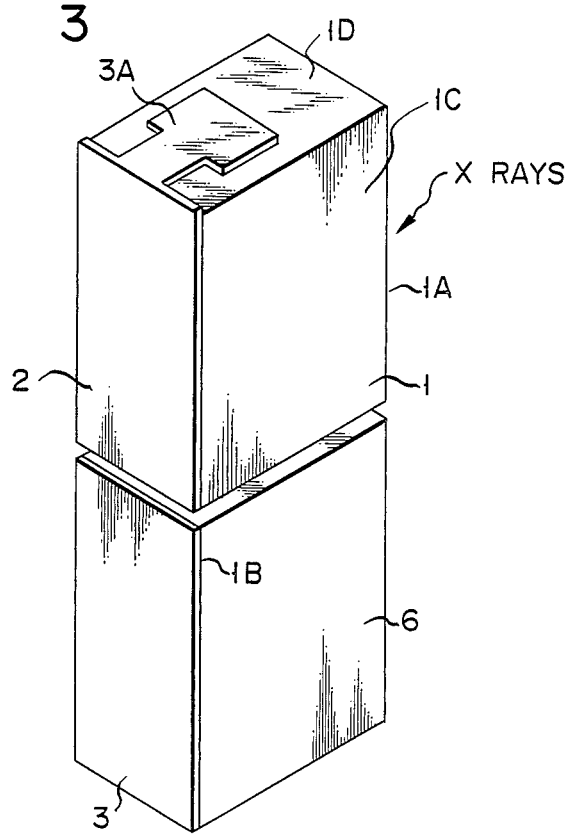
FIG. 3 is a perspective view schematically showing the construction of the X-ray detecting device in FIG. 1.

A second preferred embodiment of the invention will now be described with reference to FIG. 2. Photo-diode 2 of the X-ray detecting device of FIG. 1 is of the surface barrier type, but may be of a PIN junction type as shown in FIG. 2. In fabricating the X-ray detecting device of FIG. 2, as a first step, a scintillator element 1 is prepared similarly to the first step as described for the embodiment of FIG. 1. Surface 1B to be formed with an ITO layer is polished or glazed to form a flat mirror surface. The element is then cleaned. If the scintillator element 1 is chemically stable, the element is cleaned with organic solvent. If the scintillator element is chemically unstable, the element is cleaned with gas plasma in a glow discharge electric field in the presence of a rare gas. As a second step, surfaces 1C of the element but not polished surface 1B, are coated with a light reflecting layer 6. In a third step, a transparent ITO layer 7 is formed as one electrode by a sputtering method on polished surface 1B of element 1. In a fourth step, P-type amorphous silicon film 8 is formed on the ITO film by a plasma CVD method with mixture gas of disilane gas and monosilane gas ($SiH_4$). An I-type amorphous silicon layer 9 is formed by a plasma CVD method with monosilane gas ($SiH_4$) in a similar manner, and an N-type amorphous silicon film 10 is formed on film 9 by a plasma CVD method with mixture gas of phosphine gas and monosilane gas ($SiH_4$). In a fifth step, a chromium electrode is formed as a second electrode by a vacuum deposition method on amorphous silicon film 10 and the side surface 1C of the scintillator element. It will be understood that sequence of forming the P-type and N-type amorphous silicon layers may be opposite from that described above.

In the X-ray detecting device of FIG. 2, scintillator element 1 is coated with light reflecting layer 6, and light rays are accordingly led from the element to the photo-diode in an efficient manner. Since element 1 is directly bonded to photo-diode 2, the X-ray detecting device can be readily fabricated, and the element and the photo-diode can be accurately positioned, thereby preventing the element from being damaged by environmental temperature changes. Variations of optical characteristics in response to temperature changes are also lessened or prevented.

A third preferred embodiment of an X-ray detecting device according to the present invention will now be described with reference to FIGS. 6 to 10. Reference numerals appearing as in FIGS. 1 to 5 denote the same or corresponding parts in FIGS. 6 to 10, and the detailed description thereof will be omitted.

Figure 6:
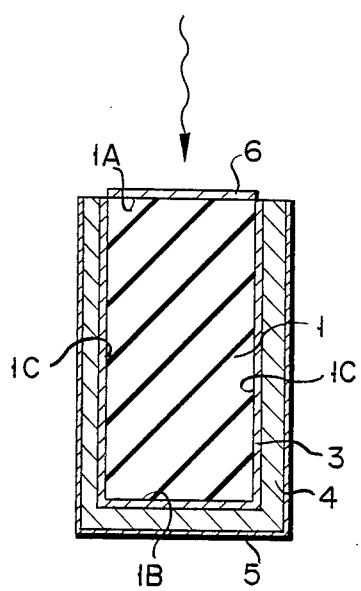
FIG. 6 is a sectional view schematically showing an X-ray detecting device according to still another embodiment of the invention.
Figure 7:
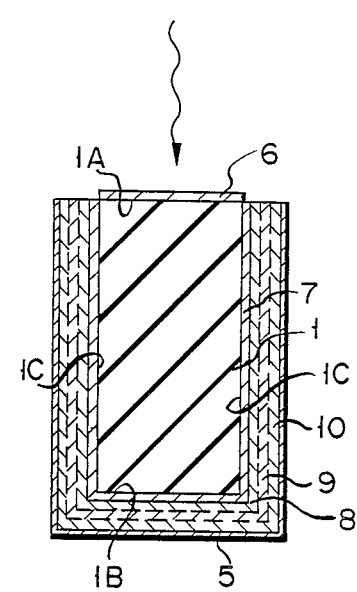
FIG. 7 is a sectional view schematically showing an X-ray detecting device according to still another embodiment of the invention.
Figure 8:
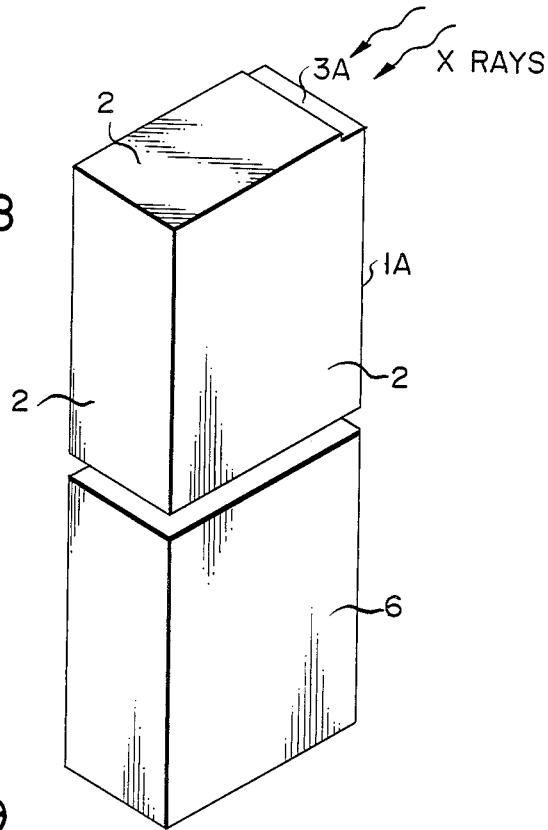
FIG. 8 is a perspective view schematically showing the construction of the X-ray detecting device in FIG. 6.
Figure 9:
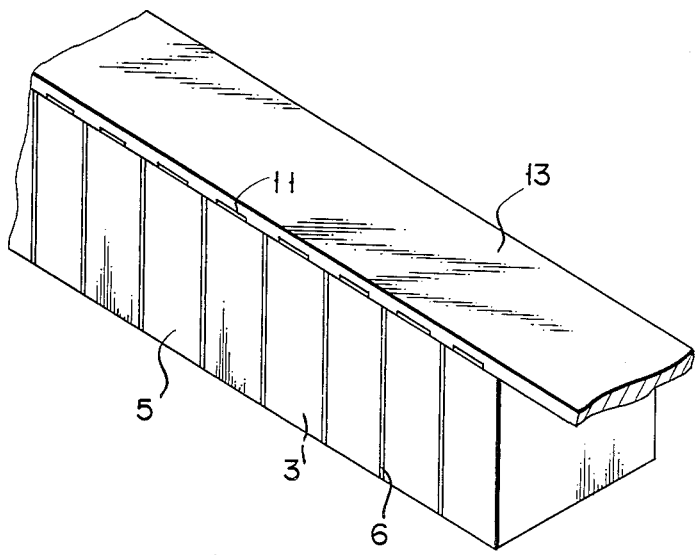
FIG. 9 is a perspective view schematically showing the construction of the X-ray detecting array associated with the X-ray detecting device in FIG. 6.

In an X-ray detecting device employing a surface barrier type photo-diode as shown in FIG. 6, a light reflecting layer is formed only on surface 1A upon which X-rays are incident, and photo-diode structures are formed on all other surfaces. In other words, transparent ITO films 3 are formed on all surfaces except surface 1A of element 1, amorphous semiconductor films 4 are formed on ITO films 3, and electrodes 5 are formed on films 4. Films 4 for producing signals from films 3 are not formed on all the surfaces of films 3, but part 3A is exposed as shown in FIG. 8, and electrically connected to a pattern 11 formed on substrate 13 as shown in FIG. 9. In an X-ray detecting device employing a PIN junction type photo-diode as shown in FIG. 8, a light reflecting layer is formed only on surface 1A upon which X-rays are incident, similarly to the above, and photo-diode structures are formed on the all other surfaces. In other words, transparent ITO films 3 are formed on all surfaces except surface 1C, amorphous semiconductor films 8, 9 and 10 are sequentially formed on films 3, and electrodes 5 are formed on film 10. Films 8, 9 and 10 are not formed on all ITO films 3 to produce signals from films 3. Part 3A is exposed and electrically connected with a pattern formed on substrate 13.

In an X-ray detecting device as shown in FIG. 6, a thin lead plate 14 is interposed between X-ray detecting devices to shield scattered X-rays, as shown in FIG. 10. Thus, plates 14 can limit or prevent noise from adjacent elements in each of the elements of the X-ray detecting device. Thin lead plates 14 could also be interposed to shield scattered X-rays between the elements of the X-ray detecting device shown in FIG. 7, for example.

In the embodiments described above, the photo-diode structures are formed on the surfaces other than surface 1A of scintillator element upon which X-rays are incident. However, the photo-diode structure may be formed on surface 1A.

According to the present invention as described above, a device for accurately detecting radioactive rays such as X-rays without undesirable responses to environmental temperature variations can be fabricated readily and efficiently.

What is claimed is:

1. A device for detecting X-rays comprising:
   a scintillator element including a first end surface for receiving incident X-rays, a second end surface opposite said first end surface, and a plurality of side surfaces positioned between said first and said second end surfaces, said second end surface and a portion of at least one of said side surfaces being polished;

a light reflecting layer disposed on a portion of said surfaces other than said second end surface and said polished portion of the at least one of said side surfaces;

a transparent electrode disposed on said second end surface and extending onto and disposed on the polished portion of the at least one of said side surfaces;

a photo-diode structure including an amorphous semiconductor layer disposed on said transparent electrode for detecting light rays generated in said scintillator element in response to impinging X-rays and converting the light rays into an electric signal; and a second electrode disposed on said photo-diode structure.

2. A device according to claim 1, wherein said photo-diode structure comprises a surface potential barrier photo-diode and said amorphous semiconductor layer includes an impurity.

3. A device according to claim 1, wherein said photo-diode structure comprises a PIN photo-diode and includes a first conductivity type amorphous semiconductor layer disposed on said transparent electrode, an intrinsic amorphous semiconductor layer disposed on said first conductivity type amorphous semiconductor layer, and a second conductivity type amorphous semiconductor layer disposed on said intrinsic amorphous semiconductor layer.

4. A detecting array for detecting X-rays comprising:
a substrate; and
a plurality of scintillator elements mounted to said substrate and positioned adjacent to one another, each of said scintillator elements including,
a first end surface for receiving incident X-rays, a second end surface opposite said first end surface, and a plurality of side surfaces positioned between said first and said second end surfaces, said second end surface and a portion of at least one of said side surfaces being polished,
a light reflecting layer disposed on a portion of said surfaces other than said second end surface and said polished portion of the at least one of said side surfaces,
a transparent electrode disposed on said second end surface and extending onto and disposed on the polished portion of the at least one of said side surfaces,
a photo-diode structure including an amorphous semiconductor layer disposed on said transparent electrode for detecting light rays generated in said scintillator element in response to impinging X-rays and converting the light rays into an electric signal, and
a second electrode disposed on the photo-diode structure.

5. A detecting array according to claim 4, wherein said photo-diode structure comprises a surface potential barrier photo-diode and said amorphous semiconductor layer includes an impurity.

6. A detecting array according to claim 4, wherein said photo-diode structure comprises a PIN photo-diode and includes a first conductivity type amorphous semiconductor layer disposed on said transparent electrode, an intrinsic amorphous semiconductor layer disposed on said first conductivity type amorphous semiconductor layer, and a second conductivity type amorphous semiconductor layer disposed on said intrinsic amorphous semiconductor layer.

7. A detecting array according to claim 4, wherein selected ones of said light reflecting layers optically isolate a corresponding one of said scintillator elements from others of said scintillator elements.

8. A detecting array according to claim 4, further comprising:
an X-ray attenuating plate disposed between adjacent ones of said scintillator elements for shielding one of the adjacent ones of said scintillator elements from X-rays scattered by the others of the adjacent ones of said scintillator elements.

9. A device for detecting X-rays comprising:
a scintillator element including a first end surface for receiving incident X-rays, a second end surface opposite said first end surface, a first pair of mutually opposing side surfaces, and a second pair of mutually opposing side surfaces, said second end surface and a portion of at least one of said side surfaces being polished;
a light reflecting layer disposed on a portion of said surfaces other than said second end surface and the polished portion of said at least one side surface;
a transparent electrode disposed on said second end surface and extending onto and disposed on the polished portion of said at least one side surface;
a photo-diode structure including an amorphous semiconductor layer disposed on said transparent electrode for detecting light rays generated in said scintillator element in response to impinging X-rays and converting the light rays into an electric signal; and
a second electrode disposed on said photo-diode structure.

10. A detecting array for detecting X-rays comprising:
a substrate; and
a plurality of scintillator elements mounted to said substrate and positioned adjacent to one another, each of said scintillator elements including,
a first end surface for receiving incident X-rays, a second end surface opposite said first end surface, a first pair of mutually opposing side surfaces, and a second pair of mutually opposing side surfaces, said second end surface and a portion of at least one of said side surfaces being polished,
a light reflecting layer disposed on a portion of said surfaces other than said second end surface and the polished portion of the at least one side surface,
a transparent electrode disposed on said second end surface and extending onto and disposed on the polished portion of the at least one side surface,
a photo-diode structure including an amorphous semiconductor layer disposed on said transparent electrode for detecting light rays generated in said scintillator element and converting the light rays into an electric signal, and
a second electrode disposed on the photo-diode structure.

11. A detecting array according to claim 10, wherein said photo-diode structure comprises a surface potential barrier photo-diode and said amorphous semiconductor layer includes an impurity.

12. A detecting array according to claim 10, wherein said photo-diode structure comprises a PIN photo-diode and includes a first conductivity type amorphous semiconductor layer disposed on said transparent electrode, an intrinsic amorphous semiconductor layer disposed on said conductivity type amorphous semiconductor layer, and a second conductivity type amorphous semiconductor layer disposed on said intrinsic amorphous semiconductor layer.

13. A detecting array according to claim 10, wherein selected ones of the light reflecting layers optically isolate a corresponding one of said scintillator elements from others of said scintillator elements.

* * * * *